United States Patent [19]

Chadwick

[11] 4,023,891
[45] May 17, 1977

[54] ADJUSTABLE MIRROR MOUNT ASSEMBLY

[75] Inventor: Curt H. Chadwick, Sunnyvale, Calif.

[73] Assignee: GTE Sylvania Incorporated, Mountain View, Calif.

[22] Filed: Dec. 15, 1975

[21] Appl. No.: 642,125

[52] U.S. Cl. .............................. 350/288; 350/252
[51] Int. Cl.$^2$ ........................................ G02B 5/08
[58] Field of Search ............... 331/94.5 C, 94.5 D; 350/252, 247, 288, 289, 245; 248/474, 476, 478–480, 485–487, 495

[56] References Cited
UNITED STATES PATENTS

| | | | |
|---|---|---|---|
| 3,588,230 | 6/1971 | De Rieux | 350/288 X |
| 3,588,232 | 6/1971 | Mostel | 350/288 |

Primary Examiner—John K. Corbin
Assistant Examiner—F. L. Evans
Attorney, Agent, or Firm—John F. Lawler; Theodore C. Jay, Jr.; Norman J. O'Malley

[57] ABSTRACT

An adjustable two-axis lockable vibration resistant mirror mount assembly with an accuracy of approximately two arc seconds features separately adjustable inner and outer coaxial gimbals having locks which clamp the gimbals in the adjusted position without altering that position. An adjusting screw for each gimbal is mounted on the frame and abuts the respective gimbal offset from its pivotal axis. Diagonally opposed pairs of U-shaped locking clips mounted on the outer gimbal straddle bosses on adjacent parts of the frame and inner gimbal, respectively, and are moved tightly against the bosses in directions parallel to the respective gimbal axes by locking screws to secure the gimbals in relatively fixed positions. After locking, the adjusting screws may be removed from the assembly. The center of the reflective mirror surface lies at the intersection of mutually perpendicular pivot axes with the normal to the mirror surface at its center substantially perpendicular to the pivot axes. The intersection of the pivot axes is very close to the front surface of the mount which allows the mirror surface to be desirably close to other elements of the optical system.

7 Claims, 7 Drawing Figures

ADJUSTABLE MIRROR MOUNT ASSEMBLY

BACKGROUND OF THE INVENTION

The invention described herein was made under a contract with the Department of the Air Force.

This invention relates to laser mirror mounts, and more particularly to an adjustable lockable laser mirror mount.

The efficiency of laser systems is critically dependent on the angular alignment of the laser end mirrors. The mirror alignment of fieldable laser systems is jeopardized by mechanical vibrations and ambient temperature changes unavoidably transmitted to the mirror mount assemblies. Thus the success of a laser system during "hands off" operation in the field is critically dependent on the stability of the end mirror mounts when exposed to vibration and temperature changes. Prior art locking devices have proven unsatisfactory for such applications. Oftentimes the mere locking of the adjusting mechanism has introduced an error in the final adjusted position of the mirror.

OBJECTS AND SUMMARY OF THE INVENTION

An object of this invention is the provision of a mirror mount assembly which may be easily adjusted and locked in a final operating position to an accuracy within two arc seconds.

A further object is the provision of an adjustable mirror mount assembly capable of withstanding severe vibrations and temperature changes with no discernable change in adjustment.

Still another object is the provision of a mirror mount having the above features and which is light in weight and compact.

A further object is the provision of an adjustable mirror mount from which the adjusting screws may be removed after the parts have been locked in final adjusted position.

Still another object is the provision of a symmetrical adjustable lockable mirror mount in which the mass of the mount is uniformly distributed so as to minimize or eliminate distortion and misalignment of the movable parts under field conditions.

A more specific object is the provision of a mount with mutually perpendicular axes of rotational adjustment with negligible interaction ("cross talk") between the axes in order to facilitate the adjustment of the mirrors.

A further object is the provision of a mount with the mirror placed close to the front surface of the mount to allow placement of the mirror close to other optical elements within the laser.

These and other objects of the invention are achieved with a two-axis adjustable mirror mount assembly having separate locking mechanisms for the two gimbals, which locks are independent of the position adjusting screws and apply to each gimbal only clamping forces which are parallel to the pivot axis of the clamped gimbal, i.e., perpendicular to gimbal movement. The adjustment of each gimbal position is isolated from the other to eliminate cross talk errors. The symmetrical distribution of component mass about the assembly axis minimizes distortion forces on the gimbals and preserves alignment accuracy under adverse environmental conditions.

BRIEF DESCRIPTION OF PREFERRED EMBODIMENT

Figure 1:
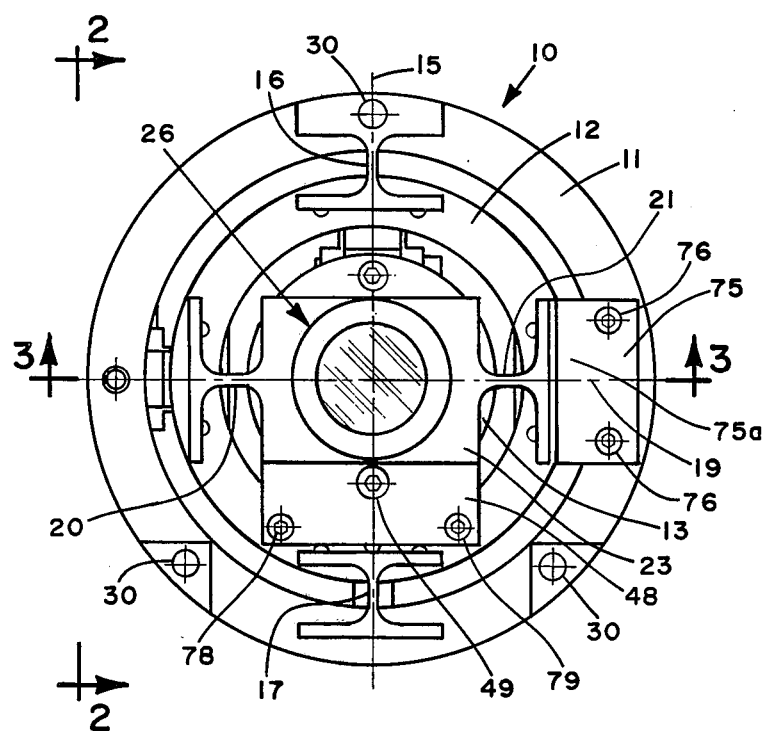
FIG. 1 is a front view (from the laser interior side) of a mirror mount assembly embodying the invention.
Figure 2:
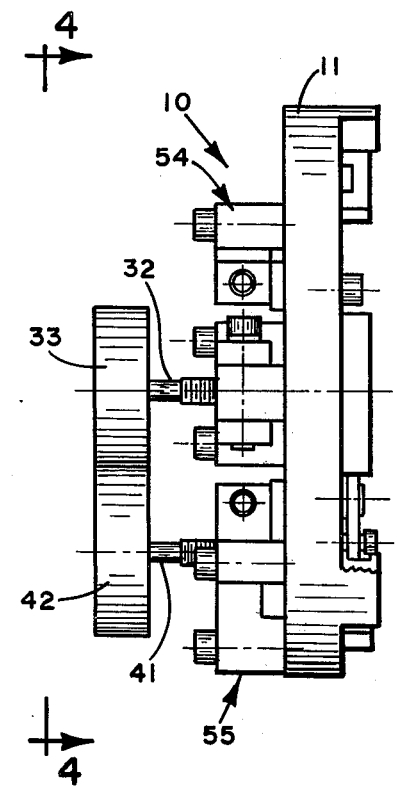
FIG. 2 is a side elevation of the assembly as viewed on line 2—2 of FIG. 1.

Referring now to the drawings, a mirror mount 10 embodying the invention comprises a ring-like frame 11, see FIG. 1, an outer ring-like gimbal 12 within frame 11 and an inner gimbal 13 within outer gimbal 12. Outer gimbal 12 is supported on frame 11 for rotation about axis 15 by diametrically opposed torsion bars 16 and 17 having twist axes coincident with axis 15. Inner gimbal 13 is supported on outer gimbal 12 for pivoting about axis 19 by means of similar diametrically opposed torsion bars 20 and 21 having twist axes coincident with axis 19. Torsion bars 20 and 21 are connected to the inner gimbal at the ends of a rectangular body 23 which is part of inner gimbal 13. Inner gimbal 12 has a central bore 24, see FIGS. 3 and 5, for receiving mirror module 26 containing mirror 27. The reflecting surface of the mirror is indicated at 28.

Frame 11, outer gimbal 12, inner gimbal 13, torsion bars 16, 17, 20 and 21 and rectangular body 23 are formed as a unitary structure. Each torsion bar is twisted slightly during fabrication of this one-piece structure so as to provide a spring preload for each axis of adjustment; outer gimbal 12 is urged by this preload in a clockwise direction as viewed in FIG. 3 and inner gimbal 13 is urged in a counterclockwise direction as viewed in FIG. 5. Mounting holes 30 formed in frame 11 permit attachment of assembly 10 to associated apparatus such as the structure of a laser such that the laser beam coincides with the center of mirror 27.

Figure 3:
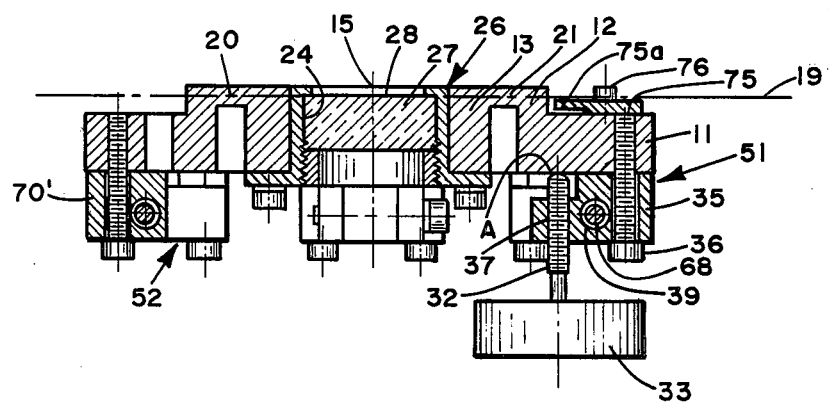
FIG. 3 is a transverse section of the assembly taken on line 3—3 of FIG. 1.
Figure 5:
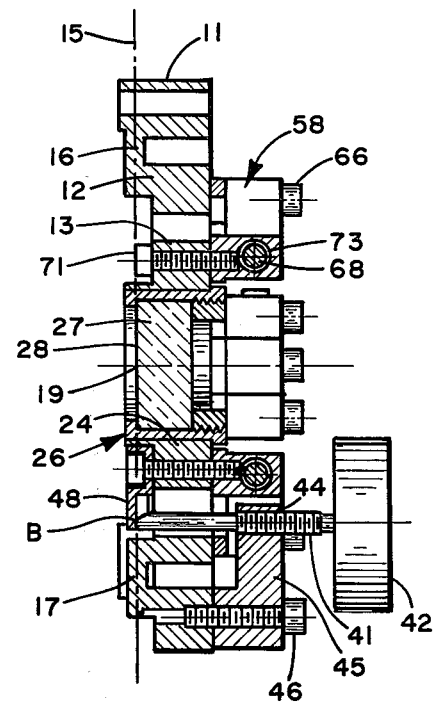
FIG. 5 is a transverse section of the assembly taken on line 5—5 of FIG. 4.

It should be noted that torsion bars 16, 17, 20 and 21 and therefore adjustment axes 15 and 19 lie substantially in a common plane which is coincident with the plane of mirror reflecting surface 28, see FIGS. 3 and 5. This plane is also very close to the front surface of the mount. As a result of this structural feature, the mirror reflecting surface 28 is located close to other optical elements in the laser system while at the same time a normal to this mirror surface at its center is perpendicular to the pivot axes at the intersection. This allows the center of the mirror surface to remain fixed relative to the frame of the mirror mount during all adjustments. This feature along with the perpendicularity of the pivot axes insures that there is virtually no interaction between the axes of adjustment and prevents the distance between the laser end mirrors from varying during adjustment of the mirrors, a critical requirement in many lasers.

Although the mount is shown in the drawings with a flat mirror, it should be understood that curved mirrors may also be used in this mount. While the mirror is shown with its reflecting surface 28 parallel to the pivot axes, this represents but one adjustment position. Mirror rotation of 1.5° is possible in both senses about each axis.

Figure 4:
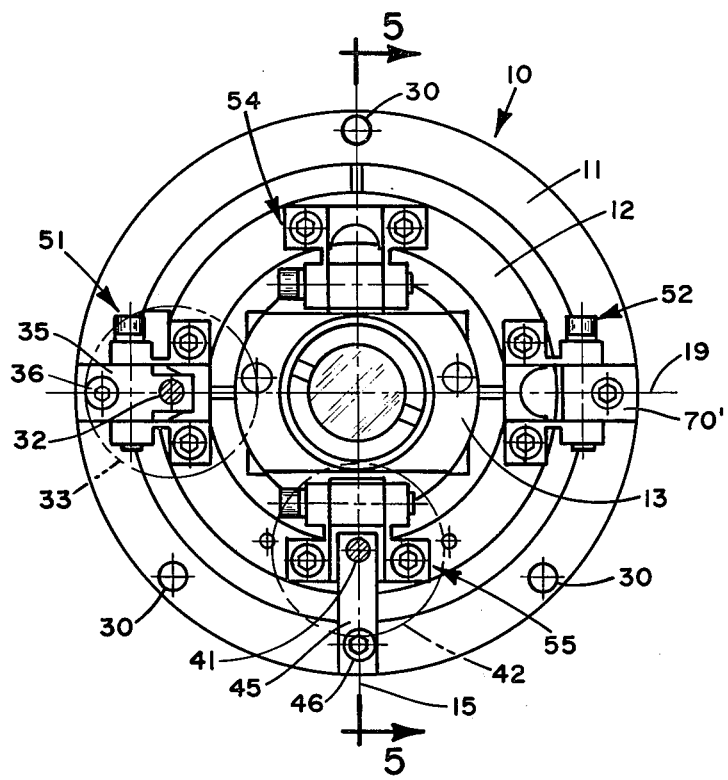
FIG. 4 is a plan view of the assembly taken on line 4—4 of FIG. 2.

Adjustment of outer gimbal 12 about its pivot axis 15 is accomplished by an adjustment screw 32 with a hand knob 33, see FIGS. 3 and 4. A boss 35 is secured by screw 36 to frame 11 offset from pivot axis 15 of the outer gimbal and has a tapped hole 37 for threadedly receiving adjustment screw 32. Hole 37 overlies outer gimbal 12 and therefore the end of screw 32 is engageable with the outer gimbal at point A, see FIG. 3, for adjusting the latter. Boss 35 is also formed with a bore 39, the purpose of which will be explained below.

Adjustment of inner gimbal 13 about its axis 19 is achieved with adjustment screw 41 having a knob 42, see FIGS. 4 and 5. Screw 41 extends through and threadedly engages a tapped hole 44 in boss 45 which is secured by screw 46 to frame 11. The end of screw 41 engages at point B a striker plate 48 secured by screw 49, see FIG. 1, to inner gimbal 13. To minimize cross talk between the axes of adjustment, the point B of contact of screw 41 with the striker plate preferably is on outer gimbal pivot axis 15 offset from the inner gimbal pivot axis 19.

It will be noted that both adjusting screws 32 and 41 are supported directly on the frame 11 to preclude random forces and moments applied to knobs 33 and 42 by the operator's hand from being transmitted to the gimbals during adjustment. This helps to minimize cross talk errors during the adjustment procedure.

In order to lock the outer and inner gimbals in their adjusted positions, two locking units 51 and 52, see FIG. 1, for the outer gimbal are located on diametrically opposite sides of outer gimbal adjustment axis 15 in a symmetrical manner relative to pivot axis 19 and two similar locking units 54 and 55 are located on diametrically opposite sides of the inner gimbal pivotal axis 19 in a symmetrical manner relative to pivot axis 15. The structure and principle of operation of each of these locking units is substantially the same and accordingly it will be sufficient for an understanding of the invention that a detailed description of but one of these locking units, namely, inner gimbal unit 54, be given; like parts of the locking units being indicated by like reference characters on the drawings.

Figure 6:
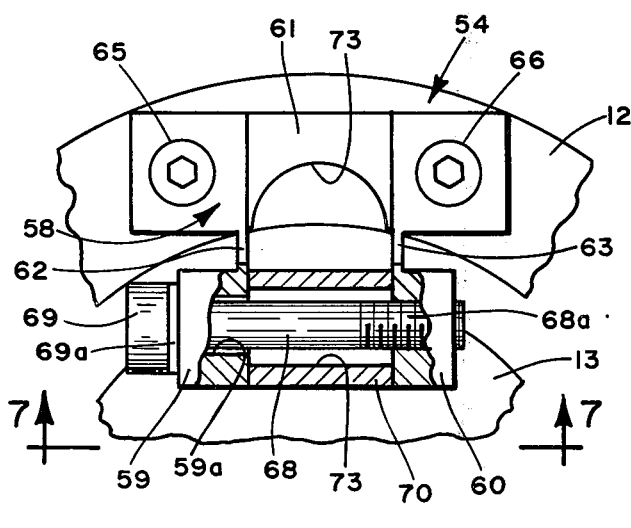
FIG. 6 is a greatly enlarged view of part of FIG. 4 showing details of a locking unit.
Figure 7:
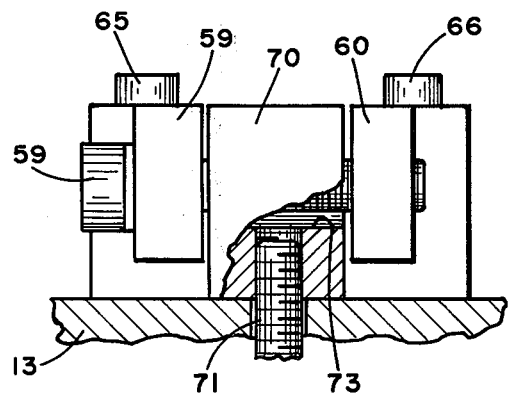
FIG. 7 is a section taken on line 7—7 of FIG. 6.

Locking unit 54 comprises a U-shaped clip 58, see FIGS. 6 and 7, having a pair of laterally spaced parallel arms 59 and 60 joined to a transverse connecting member 61 by relatively thin spring sections 62 and 63, respectively, which flexibly permit movement of the arms toward and away from each other. Connecting member 61 is secured by screws 65 and 66 to the outer gimbal 12. Arms 59 and 60 are interconnected by a locking screw 68 and for this purpose arm 60 is tapped for threaded engagement with the threaded end 68a of the screw 68 whereas arm 59 has an untapped hole 59a for receiving the cylindrical unthreaded shank of the screw. Screw head 69 presses washer 69a against the outer surface of arm 59 so that when the screw is tightened, arms 59 and 60 are drawn together. Arms 59 and 60 preferably have a block-like configuration providing substantial parallel gripping surface areas between the arms. The axis of screw 68 is parallel to pivot axis 19 and arms 59 and 60 move together in this same direction.

Located between clip arms 59 and 60 is a cube-like boss 70 with flat parallel sides adjacent to the gripping surfaces of the arms and secured by screw 71 to inner gimbal 13. Thus boss 70 is movable relative to clip arms 59 and 60 transversely of the axis of the locking screw 68 when the inner gimbal is adjustably moved about its pivots relative to the outer gimbal. A bore 73 in boss 70, similar to the bore 39 in boss 35 mentioned previously, has an inside diameter substantially greater than the diameter of locking screw 68 to permit such relative movement between the inner and outer gimbals.

In each of the locking units 51 and 52, the clip connecting member 61 is secured at diametrically opposite locations to the outer gimbal but clip arms 59 and 60 extend radially outwardly from the outer gimbal on opposite sides of bosses 35 and 70' secured to frame 11. In other respects, the locking units are constructed in substantially the same manner. Boss 35 in addition to constituting part of a locking unit for the outer gimbal also receives and supports outer gimbal adjustment screw 32 as explained above. The arcuately shaped inner edge 73 of clip connecting member 61 provides a clearance for inner gimbal adjustment screw 41. The locking clips may be identical so as to be used interchangeably.

In order to limit pivotal movement of the preloaded outer gimbal 12, a stop plate 75, see FIGS. 1 and 3, is secured to frame 11 by screws 76 so that a portion 75a of the plate overlies the outer gimbal. A similar purpose for inner gimbal 13 is served by screws 78 and 79, see FIG. 1, which threadedly engage gimbal 13 and pass through clearance holes in striker plate 48. They are adjusted so that their heads clear the surface of plate 48 by a distance to limit the pivotal motion of gimbal 13 to the required amount.

It will be noted that locking units 51, 52, 54 and 55 are symmetrically disposed about the central axis of the mirror so as to contribute to the dynamic balance of the assembly and to minimize stresses induced by vibrations tending to cause misalignment of the parts. In addition, the dual locking mechanism for each gimbal provides even greater security against loosening of parts. The mount is constructed from the same material, such as beryllium-copper alloy, which, together with the symmetry of the mount assembly, insures that its adjustment will not be affected by uniform changes in temperature.

In operation, the mirror is adjusted by pivoting of the outer and inner gimbals. The locking screws of the four locking units 51, 52, 54 and 55 initially are loosened to permit movement of the gimbals relative to each other and to the frame; the preloaded torsion bars insuring that outer gimbal 12 and inner gimbal striker plate 48 bear positively against the respective adjustment screws. Outer gimbal adjustment screw 32 is then rotated by knob 33 causing the outer gimbal to rotate about axis 15 relative to the frame until the plane of the mirror surface 28 is in the desired position as may be determined, for example, by the intensity of the light beam emanating from the laser. Knobs 33 and 42 are rotated alternately until the laser beam intensity is at a maximum. This process is repeated for both laser end mirrors. When both mirror positions are optimal, both mirror mounts are locked. Each outer gimbal is locked by tightening the locking screws 68 of locking units 51 and 52 causing arms 59 and 60 of each clip to bear tightly against adjacent surfaces of the intermediate associated bosses, respectively. It should be noted that the forces exerted by locking clip arms 59 and 60 against each boss are parallel to pivot axis 15 and so this locking action does not upset the outer gimbal adjustment. Each inner gimbal is then locked by tightening the locking screws 68 of inner gimbal locking units 54 and 55 as described above so as to secure the position of the inner gimbal relative to the outer gimbal. Thereafter adjustment screws 32 and 41 may be removed completely from the assembly.

What is claimed is:

1. An adjustable mirror mount assembly comprising a frame adapted to be secured to utilization apparatus,
   an outer gimbal pivotally supported on and within said frame for angular movement about a first axis,
   an inner gimbal pivotally supported on and within said outer gimbal for angular movement about a second axis perpendicular to said first axis,
   a mirror supported on said inner gimbal,
   a first adjusting screw supported on said outer frame for axial movement transversely of the plane of the mirror and engageable with said outer gimbal offset from said first axis,
   a second adjusting screw supported on said outer frame for axial movement transversely of the plane of the mirror and engageable with said inner gimbal offset from said second axis,
   first locking means operationally independent of said screws extending between said outer gimbal and said frame for selectively locking same together, and
   second locking means operationally independent of said adjusting screws extending between said outer and inner gimbals for selectively locking same together.

2. The assembly according to claim 1 in which each of said first and second locking means comprises a clip having a connection member rigidly secured to said outer gimbal and a laterally spaced pair of arms projecting from said member, said arms being movable toward and away from each other, means for moving said arms of each pair toward and away from each other into locked and unlocked positions, respectively, the arms of said first locking means being engageable with said frame, the arms of said second locking means being engageable with said inner gimbal.

3. The assembly according to claim 2 in which said frame has a boss between and clampable by said arms of the first locking means clip when in said locked position, said inner gimbal having a boss between and clampable by said arms of the second locking means clip when in said locked position.

4. The assembly according to claim 3 in which said arm moving means comprises a screw extending through the associated arms and having threaded engagement with one of said arms, each of said bosses having a bore with a diameter substantially larger than the diameter of said screw and loosely receiving the associated screw whereby to permit limited movement of the boss relative to said arms when in the unlocked position.

5. The assembly according to claim 1 in which locking forces produced by said first and second locking means are in directions parallel to said first and second axes, repectively, whereby to be perpendicular to the direction of the respective adjustment screw forces.

6. The assembly according to claim 1 in which said mirror has a reflecting surface, said first and second axes intersecting substantially at the center of said reflecting surface.

7. An adjustable mirror mount assembly comprising a frame,
   an outer gimbal pivotally supported on and within said frame for angular movement about a first axis,
   an inner gimbal pivotally supported on and within said outer gimbal for angular movement about a second axis perpendicular to said first axis,
   a mirror supported on said inner gimbal,
   means for pivoting said outer and inner gimbals about said first and second axes, respectively,
   first locking means extending between said outer gimbal and said frame and operative to apply a locking force therebetween only in a direction parallel to said first axis, and
   second locking means extending between said outer and inner gimbals and operative to apply a locking force therebetween only in a direction parallel to said second axis.

* * * * *